United States Patent [19]

Jines

[11] 4,238,979

[45] Dec. 16, 1980

[54] STABILIZING DEVICE FOR HOLLOW WORKPIECES

[76] Inventor: Arnold R. Jines, 6822 Balmoral Rd., Indianapolis, Ind. 46241

[21] Appl. No.: 60,395

[22] Filed: Jul. 25, 1979

[51] Int. Cl.³ .................. B23B 25/00; B23B 23/02; B23B 5/22
[52] U.S. Cl. .................. 82/38 R; 82/33 R; 82/44; 279/2 R
[58] Field of Search .................. 82/44, 45, 38 R, 33; 279/2 R

[56] References Cited

U.S. PATENT DOCUMENTS

| | | | |
|---|---|---|---|
| 1,944,255 | 1/1934 | McFall et al. | 82/44 |
| 2,286,292 | 6/1942 | Mall | 82/33 R |
| 2,345,091 | 3/1944 | Brace et al. | 279/2 R |
| 2,453,717 | 11/1948 | Long . | |
| 2,466,974 | 4/1949 | Stupakoff et al. | 279/2 R |
| 2,542,967 | 2/1951 | Waechter | 279/2 R |
| 2,659,260 | 11/1953 | Layne et al. . | |
| 2,686,681 | 8/1954 | Nyland . | |
| 2,709,598 | 5/1955 | Retz | 82/44 |
| 2,851,916 | 9/1958 | Grandy et al. . | |
| 3,118,683 | 1/1964 | Hoshizaki . | |
| 3,289,505 | 12/1966 | Pyke . | |
| 3,422,338 | 3/1974 | Molnar . | |
| 3,584,714 | 6/1971 | Ryswick | 279/2 R |
| 3,678,790 | 7/1972 | Riley | 82/38 R |
| 3,834,257 | 9/1974 | Ganser | 82/44 |
| 3,874,681 | 4/1975 | Lanser | 279/2 R |
| 4,126,064 | 11/1978 | Tarrant . | |

Primary Examiner—Harrison L. Hinson
Attorney, Agent, or Firm—Woodard, Weikart, Emhardt & Naughton

[57] ABSTRACT

A stabilizing device of durable, compressible, material, in which the rotation of the device is coupled to the rotation of the stabilized workpiece in a chuck by the pressing of the device against the base of a bore in the workpiece. The resulting compression of the material expands its effective diameter to produce a stabilizing effect. As the device wears through use, the effective diameter may be increased by means of a compression screw.

17 Claims, 6 Drawing Figures

STABILIZING DEVICE FOR HOLLOW WORKPIECES

BACKGROUND OF THE INVENTION

1. Field of the Invention

The field of the invention is those devices which stabilize a hollow workpiece as the workpiece is rotated in a chuck and machined. More particularly the field of the invention is such devices which stabilize a workpiece having a tubular portion, as it is being sawed or cut into a plurality of annular rings.

2. Description of the Prior Art

Numerous devices have been employed in the prior art to stabilize a rotating, hollow workpiece during a machining operation. U.S. Pat. No. 3,289,505 to Pyke and U.S. Pat. No. 3,422,709 to Rees illustrate two such devices which accomplish centering of the tubular workpiece with three radial projections that engage with the interior surface of the workpiece.

There are also various devices which incorporate means to expand the stabilizing device after they have been inserted within the workpiece. In U.S. Pat. No. 2,453,717 to Long is disclosed one such device in which a plurality of wedges are moved to expand the effective diameter of the stabilizing device and to engage the interior suface of the workpiece. In U.S. Pat. No. 2,659,260 to Layne et al. is disclosed another such work holding device which engages the interior surface of the workpiece by moving wedges which increase the effective diameter of the device.

In U.S. Pat. No. 2,686,681 is disclosed a device for holding a workpiece which incorporates a flexible metal diaphragm having a frustoconical shape. Axial pressure is applied to the diaphragm, causing it to flex and thus expand its effective diameter.

In U.S. Pat. No. 2,851,916 to Grandy is disclosed an example of a device which stabilizes a tubular workpiece during machining by means of hydrolics. These devices are typically elaborate and cumbersome in operation.

Arbors have generally not been used to stabilize tubular workpieces during a cutting procedure wherein the tubular workpiece is being cut into a plurality of annular rings. A common technique, currently used, is to employ a multiple cut saw having a plurality of circular saws which successively have slightly smaller diameters. By using such a multiple cut saw, a plurality of rings can be cut off of a tubular workpiece in one operation, without the use of a stabilizing device. Because the saw blades are staggered, each ring is cut off successively as each saw cuts through the workpiece. This type of multiple cut saw allows a substantial increase in efficiency. However, there is a tendency for burrs to develop when the last portion of each ring is being cut, and there is also occasional damage to the saw blades.

A mechanism for cutting tubular lengths which does not utilize a stabilizing arbor is disclosed in U.S. Pat. No. 3,797,338 to Molnar. In the Molnar devices, lengths of tubing are revolved around a drum and are separated into selected lengths by a saw. This type of mechanism is not suited for use where various machining operations are performed prior to the sawing operation.

In U.S. Pat. No. 4,126,064 to Tarrant is disclosed a machine which cuts an annular piece from tubular stock. The Tarrant device is useful in preventing the development of burrs and does not incorporate a stabilizing arbor. However, the Tarrant device involves a somewhat complicated procedure and only cuts off one annular piece at a time.

Arbors have not been generally adaptable for use in stabilizing a tubular workpiece during an operation which cuts a plurality of rings in a single procedure. Arbors of the prior art are generally not easy to repeatedly insert and remove in a simple motion; they do not have properties that would prevent the development of burrs when a saw cuts through the workpiece; and they would not be able to withstand damage caused by the saw blades cutting too deeply.

It is also preferable for the stabilizing device to provide support along the entire length of the tubular workpiece upon which the cutting operation is being performed. This is so that the stabilization of the workpiece is not dependent upon the precise location of the arbor or upon the order in which the annular rings are cut off and so that the individual rings are supported as the saws cut through the workpiece.

In U.S. Pat. No. 3,118,683 to Hoshizaki is disclosed an arbor which is more particularly adaptable to a multiple cutting operation than most arbors because it can be repeatedly inserted and removed in a simple motion. In the Hoshizaki device, balls are retained in longitudinal grooves in a substantially cylindrical arbor. Upon insertion within a tubular workpiece, the balls deform to accommodate the inside diameter of the tube and roll along the grooves to aid in the insertion of the arbor. This arbor is insertable and removable in a simple operation. However, the Hoshizaki device is particularly susceptible to damage which may result if any of the cutting saws should penetrate too deeply. Also, the Hoshizaki device would not provide stabilizing support along the entire length of the workpiece during the cutting operation. This is undesirable because the stabilization of the workpiece should not be dependent upon the precise location of the arbor in relation the workpiece, and also because the separation between the workpiece and the arbor would have a tendency to cause burrs.

SUMMARY OF THE INVENTION

In general terms, the present invention is a new and useful device for stabilizing the rotation of a hollow workpiece, as it is being machined in a chuck. The device is particularly advantageous because it provides substantial support to the workpiece and can be repeatedly inserted and removed in a simple push-on motion.

DESCRIPTION OF THE PREFERRED EMBODIMENTS

Figure 1:
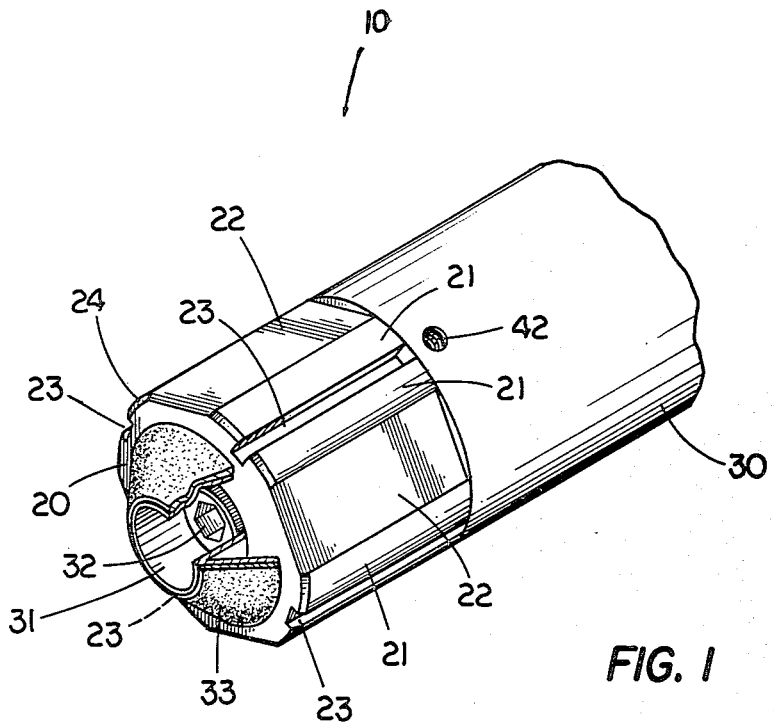
FIG. 1 is a fragmentary, perspective view of a portion of a stabilizing device of the present invention which is inserted within a workpiece.

The workpiece engaging portion of the embodiment of FIG. 1 is arbor 10, which includes an integral, substantially cylindrical member 20 of polyurethane material. Four longitudinal grooves 23 extend the length of member 20 and are spaced equally about the perimeter of the arbor. Four substantially flat surfaces 22 also extend the length of member 20 and also are equally spaced about the perimeter of the arbor. Between flat surfaces 22 and grooves 23 are arcical surface portions 21 which define an outside diameter of member 20. At one end of member 20 are beveled surface portions 24.

Figure 2:
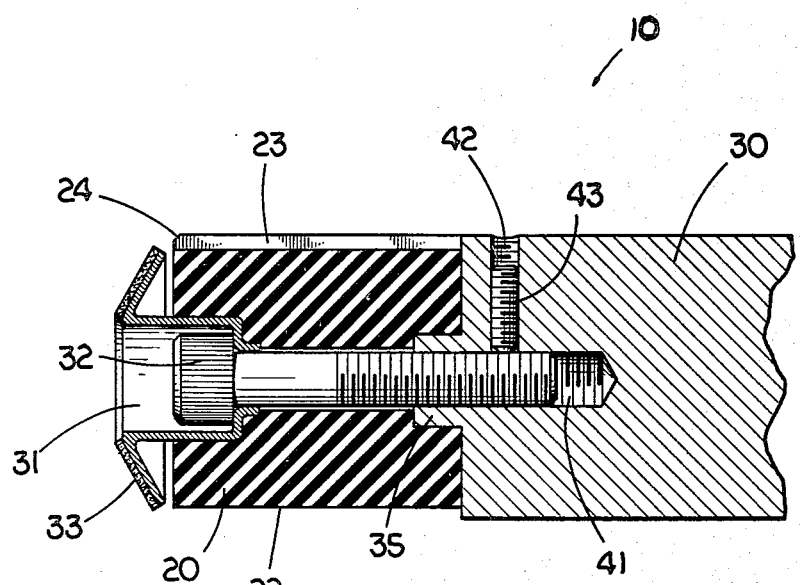
FIG. 2 is a second partial fragmentary view of the stabilizing device of FIG. 1.
Figure 4:
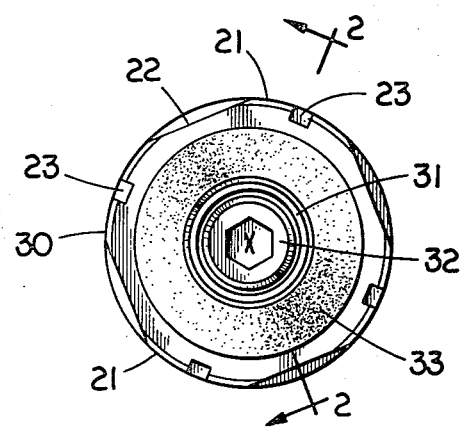
FIG. 4 is an end view of the stabilizing device of FIGS. 1, 2 and 3.
Figure 3:
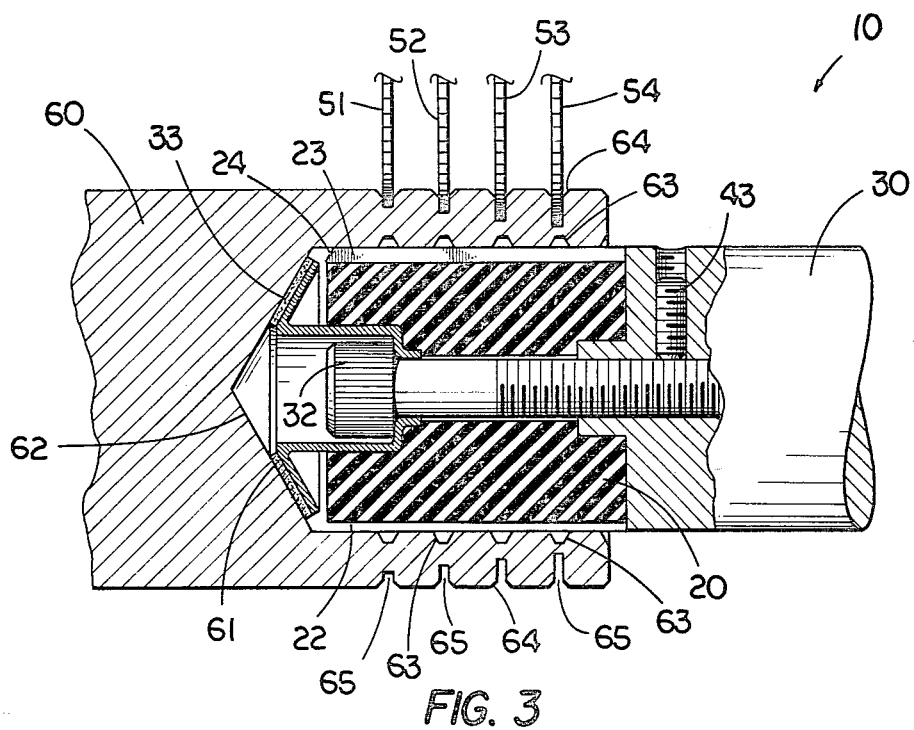
FIG. 3 is a partial fragmentary view of the stabilizing device of FIGS. 1 and 2 inserted within a workpiece.

FIG. 2 shows the internal structure of the arbor illustrated in FIGS. 1, 3 and 4 along radially sectional lines 2—2. Member 20 is attached to base 30 by compression screw 32 which fits through a central longitudinal bore in member 20, and is threadedly anchored into a threaded bore 41 in base 30. Radial bore 42 in base 30 intersects with bore 41. Locking screw 43 is threaded into bore 42 and engages with compression screw 32 to maintain the position of compression screw 32.

The head of compression screw 32 fits into a metal seat member 31. Seat 31 is shaped so as to extend beyond the first end of member 20, forming a frustoconical shape. Attached to the outside of the frustoconical portion of seat 31 is asbestos material 33.

FIG. 3 shows the arbor 20 of FIGS. 1, 2 and 4 in engagement with workpiece 60. Workpiece 60 is bar stock which is in the process of being machined into collars. In previous operations, a longitudinal bore 61 has been drilled; annular notches 63 have been machined on the inside surface; and annular notches 64 have also been machined on the outside surface of workpiece 60. Notches 63 and 64 have a 45° bevel on each side, and have been machined to provide a chamfer for the finished collars. FIG. 3 shows workpiece 60 in the operational step in which a multi-cut saw (not shown) is cutting off a series of annular rings from workpiece 60. Saws 51 through 54 have partially penetrated workpiece 60 at notches 64, and when the sawing operation is completed four annular pieces will be cut from workpiece 60 which will be used as blanks to be eventually manufactured into collars.

Asbestos surface 33 has the same taper angle as the taper at the base 62 of bore 61. In FIG. 3, asbestos surface 33 is pressed against the base 62 of bore 61. This pressing action couples the rotation of workpiece 60 in a chuck (see FIG. 6) to the rotation of arbor 20, which is mounted to freely rotate about its central axis (see FIG. 6). Asbestos was selected because of its high coefficient of friction, although other materials which have suitably high coefficients of friction may be substituted. As is later described, the frictional coupling can be accomplished by directly pressing the polyurethane member against the base of the bore, owing to the high coefficient of friction of the polyurethane material used.

Figure 6:
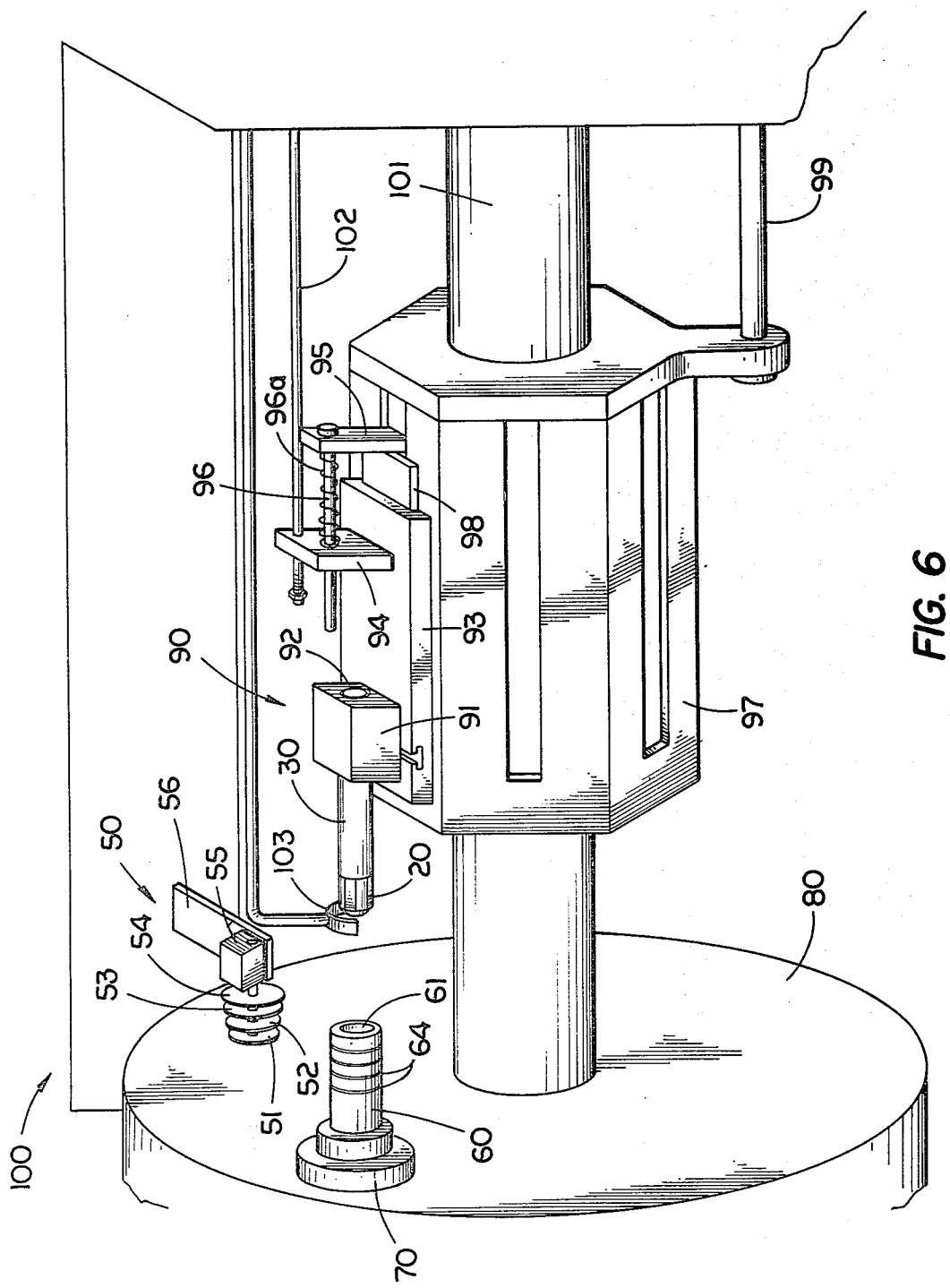
FIG. 6 is a perspective view of a preferred embodiment mounted in a screw machine which has been tooled for a multiple sawing operation.

FIG. 6 illustrates arbor 10 mounted in a screw machine 100 which is set up for a sawing operation. FIG. 6 illustrates the general concept of the application of the present invention to such a sawing operation, however it is to be understood that individual features have been simplified and positioned for ease of illustration. Workpiece 60 is bar stock mounted in chuck 70 which is rotatingly driven by chuck driving means 80 (generally shown). In previous operations, a longitudinal bore 61 has been drilled in workpiece 60, and annular notches 64 have been machined to provide chamfers for the finished collars. Bar 60 is of indefinite length. After the completion of each full machine cycle, workpiece 60 can be fed a distance through chuck 70, thereby preparing workpiece 60 for another machine cycle. The other operations (i.e. boring, notching, and advancing of workpiece 60 in chuck 70) of the machine cycle have not been illustrated.

Multi-cut saw 50 is attached to saw mount 56 and may be moved to engage and disengage with workpiece 60. Multi-cut saw 50 has a motor 55 which rotatingly drives saw blades 51 through 54. Saw blades 51 through 54 each has successively slightly greater diameter, so that the annular rings are cut off from workpiece 60 sequentially (see also FIG. 3).

Arbor 10 is mounted to screw machine 100 and is in alignment with the central axis of chuck 70. Substantially cylindrical member 20 is attached to base 30 in the manner described in the previous diagrams. Base 30 is attached to mounting block 91 by being engaged with thrust type roller bearings 92 mounted within mounting block 91. Mounting block 91 is bolted to a sliding mount 93 which is slidably mounted to sliding mount base 98.

Sliding mount base 98 is bolted to thrust block 95 and mounted to an end slide 97 of screw machine 100. Ram means 99 is power driven to move end slide 97 back and forth along the central shaft 101. Thrust block 94, compensating screw 96, and compensating spring 96a, in combination, provide means for adjusting the final pressure of the arbor 10 against the base of the bore of workpiece 60. As ram 99 drives end slide 97 toward chuck 70, arbor 10 presses against base 62 of bore 61 (as shown in FIG. 3), sliding mount 93 slides back along sliding mount base 98 until the pressure against the base of the bore is counterbalanced by the compression of compensating spring 96a. By adjusting the setting of compensating screw 96, the pressure against the base 62 of bore 61 can be selected.

Locating rod 102 of screw machine 100 is used in other applications. For instance rod 102 would be used where it is desired to insert arbor 10 not more than a predetermined distance into a tubular workpiece. Pick-off bar 103 is used to remove the severed annular rings from arbor 10 after the sawing operation has been completed.

Figure 5:
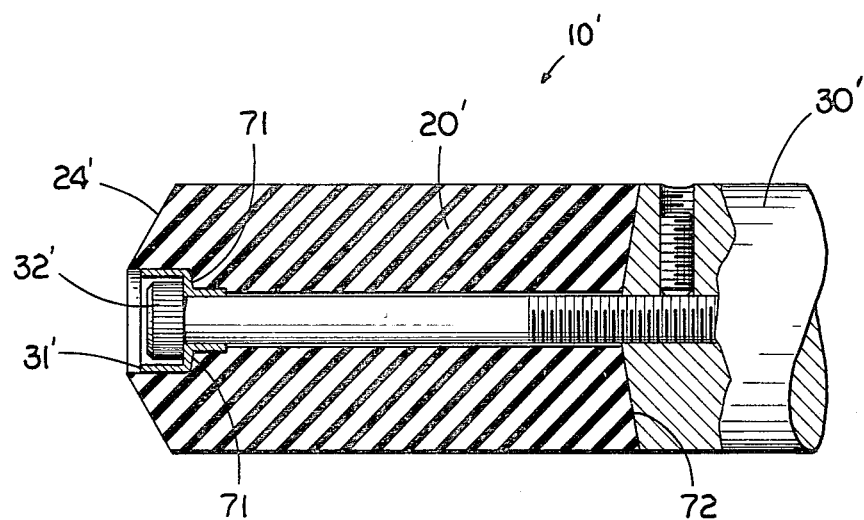
FIG. 5 is a partial fragmentary view of a second stabilizing device of the present invention.

FIG. 5 discloses an embodiment of the present invention in which the coupling means is accomplished by directly engaging the polyurethane member wih the base of the bore of the workpiece. Beveled surface 24' is further extended than beveled surfaces 24 of the embodiment of FIGS. 1, 2, 3, and 4 and directly presses against the base of the bore, when arbor 10' is inserted in a workpiece. The embodiment of FIG. 5 has been illustrated merely to show that the coupling of the arbor with the workpiece can be accomplished directly with the polyurethane material, and to show the additional function of tapered surfaces 71 and 72 as is later described. In all other respects, a preferred embodiment of the present invention incorporating these features illustrated in FIG. 5, would have the same structural characteristics and features illustrated in the other diagrams. Therefore except as otherwise stated, the descriptions referring to the characteristics and advantages of arbor 10 also apply to arbor 10'.

One reason for the selection of polyurethane material in the preferred embodiment is its characteristic of compressibility. Because of its compressibility, when arbor 10 is inserted and pressed against the base 62 of bore 61, the overall diameter of member 20 increases slightly to frictionally grip workpiece 60. In the arbor as described in FIGS. 1-4, this compression is supplied by the pressing of seat 31 against member 20. In the arbor of FIG. 5, the compression is supplied by the pressing of beveled surface 24' directly against the base of the bore. Because the material is also elastic, the arbor returns to its pre-insertion diameter upon its removal.

The characteristic of compressibility of the polyurethane material also provides an advantage which substantially increases the effective life of the present invention. In an operation, such as the multi-cut sawing operation disclosed in FIG. 6, where arbor 10 must be repeatedly inserted and removed, the repeated insertion and removal eventually wears away the outside surface of member 20, thus diminishing the effective diameter. However, by tightening compression screw 32, member 20 is additionally compressed and therefore expands about its outside surface. This simple procedure increases the effective diameter of arbor 10.

Because the expansion of the material may not be constant along the length of member 20, it is sometimes desirable to true up the outside diameter of the arbor in a lathe, and also it is sometimes desirable to place shims between seat 31 and member 20. The tapered surfaces 71 and 72 disclosed in the embodiment of FIG. 5, are designed to provide even expansion of member 20 during this procedure thus minimizing the need for these minor adjustments.

The ability to so adjust the effective diameter of the arbor greatly increases its life, thus enhancing the usefulness of the present invention. The procedures hereinabove described for so adjusting the diameter are quite simple to perform and can be completed in a matter of a couple of minutes.

Besides its compressibility, there are also a number of other characteristics of polyurethane which make it particularly suited for the preferred embodiment. These characteristics include (1) hardness (Shore D 50) of the particular polyurethane used, (2) elasticity, (3) high coefficient of friction, (4) abrasion resistance, (5) resilience, (6) oil resistance and (7) resistance to tearing. These properties in a plastic, particularly the properties of hardness, oil, resistance and high coefficient of friction, make polyurethane particularly suited for use in the preferred embodiment. Other materials, having similar characteristics, may also be suitable for use in the present invention.

The specific polyurethane elastomer which has been used in the preferred embodiment is Compothane 50 which is distributed by Compo-cast, a division of C.E.S., Inc. Some of the properties of Compothane are: Ultimate tensile strength—6000 psi; Hardness—Shore D 50; Tear Strength—680 pounds/lineal inch; and Bashore Resilience—24.

The particular hardness of the material used is an important aspect of the present invention. Too hard of a material (estimated to be in excess of Shore D 75) would not provide the desired characteristics of compressibility and may cause damage to the interior of the workpiece during the insertion and removal process. On the other hand, too soft of a material would not provide adequate support for the workpiece while it is being machined.

The stabilizing device of the present invention is not susceptible to damage caused by burrs or from the saws 51 through 54 running too deep, as would be the case for other arbor devices which are usually made of metal. If a saw should run into member 20, the saw merely cuts a groove in the member. Because of the particular hardness of the polyurethane material used, there is neither damage to the saw nor to the invention. In fact, the running of the saws into the stabilizer arbor actually has the effect of reducing the occurrence of burrs. Even though an annular cut has been made in member 20, the effectiveness of the arbor is not diminished. For other devices, however, substantial damage would be caused by the accidental running of the saw too deeply and extensive repair would be required.

Grooves 23 prevent the buildup of pressure when arbor 10 is being inserted within a workpiece and prevent the development of excessive drag upon removal of the sliced rings from arbor 20. In this manner, grooves 23 facilitate the easy insertion of arbor 10 and removal of the rings from arbor 10. Grooves 23 also facilitate the compression of member 20 upon insertion within workpiece 60. If arbor 10 is slightly larger than the inside diameter of workpiece 60, then grooves 23 allow member 20 to expand in an arcical direction upon insertion thus decreasing its effective diameter. Generally flat surfaces 22 also allow the arcical expansion of member 20 upon insertion. By thus preventing too tight of a fit, recessed surface areas 22 and 23 facilitate insertion and removal. Recessed surface areas 22 and 23 serve another function in that they provide passageways for excess oil that may be remaining after completion of the previous boring operation.

Beveled surfaces 24 also facilitate insertion of arbor 10, as they aid in centering arbor 10 with respect to workpiece 60 in the event that they are slightly off center or in case arbor 10 is slightly larger than bore 61.

The present invention also works well when the diameter of the arbor is undersized. This is because upon insertion within workpiece 60, the pressing of the arbor against the base of a bore has a tendency to compress it thus slightly increasing the diameter to provide a tight fit. This feature, besides being helpful in preventing the development of burrs, also extends the length of time the present invention can be used between the diameter adjusting procedures as hereinabove described.

The present invention may be used to stabilize tubular stock as well as bar stock. Where tubular stock is used, a counter bore is drilled to provide the desired final diameter. The drilling of such a counter bore provides a base surface area against which beveled surface 24' may be pressed.

The present invention has the advantage of simplicity in that it provides support of the workpiece over a substantial area in one simple push-on movement. The supporting of the workpiece over a substantial area significantly benefits a multiple sawing operation because the individual annular rings are maintained steady as the saws cut through the workpiece. This has the effect of preventing the development of burrs.

There are various alterative designs to that which has been hereinabove described which may still fall within the spirit of the invention. For instance, the particular number, size and shape of the recessed surface areas 22 and 23 may be varied. Substitutes for polyurethane material having similar desirable characteristics as hereinabove described may be used. The means of compressing as detailed in the foregoing description and drawings may be varied and still fall within the spirit of the invention. Also, the use of the present invention in the sawing of four annular rings to be used as collars was given only by way of example. More pieces could be sawed off at one time and the present invention is useful where any of a variety of pieces are to be sawed off at one time.

Therefore while there have been described above the principles of this invention in connection with specific apparatus and techniques it is to be clearly understood that this description is made only by way of an example and not as a limitation to the scope of the invention.

What is claimed is:

1. A stabilizing device for stabilizing the rotation of a workpiece positioned in a chuck, the workpiece having an inside surface portion defining a hole, said device comprising:
   (a) a workpiece engaging member including compressible, elastic material, said material having an outside surface portion adapted to engage the inside surface portion of the workpiece,
   (b) means for mounting said workpiece engaging member such that it may freely rotate about the central axis of the chuck, and
   (c) means for frictionally coupling the rotation of said workpiece engaging member with the rotation of the chuck, said coupling means including means for axially compressing said material such that said material radially expands to frictionally grip the inside surface portion of the workpiece.

2. The stabilizing device of claim 1 in which said compressible material has a hardness less than Shore D 75.

3. The stabilizing device of claim 1 in which the workpiece includes a base surface portion defining the base of the hole and in which said means for axially compressing said material includes means for pressing said workpiece engaging member against the base surface portion.

4. The stabilizing device of claim 1 in which the hole in the workpiece and said workpiece engaging member are substantially cylindrical.

5. The stabilizing device of claim 1 in which said outside surface portion is arcical and defines an outside diameter.

6. A stabilizing device for stabilizing the rotation of a workpiece positioned in a chuck, the workpiece having an inside surface portion defining a substantially cylindrical bore, said device comprising:
   (a) a substantially cylindrical workpiece engaging member including compressible, elastic material, said material having an outside surface portion adapted to engage the inside surface portion of the workpiece, said material having a hardness of less than Shore D 75,
   (b) means for mounting said workpiece engaging member such that it may freely rotate about the central axis of the chuck, and
   (c) means for rotating said workpiece engaging member about its central axis in synchronization with the rotation of the workpiece in the chuck.

7. A stabilizing device for stabilizing the rotation of a workpiece positioned in a chuck, the workpiece having a cylindrical axial bore defining an inside diameter, said device comprising:
   (a) a substantially cylindrical member of compressible, elastic material, said material having a hardness less than Shore D 75, said substantially cylindrical member having an arcical outside surface portion which extends longitudinally and defines an outside diameter which is about the same as the inside diameter of the workpiece;
   (b) means for mounting said cylindrical member such that said cylindrical member is concentric with said workpiece and in which said arcical outside surface portion supportingly engages the workpiece; and
   (c) means for rotating said member about its central longitudinal axis in synchronization with rotation of the chuck.

8. The stabilizing device of claim 7 in which said material is polyurethane.

9. The stabilizing device of claim 7 in which said substantially cylindrical member has a plurality of said arcical outside surface portions, and has a plurality of longitudinal recessed surface portions extending from the first end of said member.

10. The stabilizing device of claim 9 in which said longitudinal recessed surface portions include a plurality of longitudinal grooves, each of said longitudinal grooves being laterally spaced between two of said arcical surface areas, and a plurality of longitudinal generally flat surface areas, each of said generally flat surface areas being laterally spaced between two of said arcical outside surface areas.

11. The stabilizing device of claim 7 additionally comprising compression means for compressing said member such that the outside diameter of said member is increased.

12. The stabilizing device of claim 11 additionally including:
   (c) a base member; and
   (d) a compression screw; and in which said compression means includes said substantially cylindrical member having a longitudinal bore through its length, said base member having a threaded bore, and said compression screw extending through the length of the longitudinal bore in said member and being threadedly anchored into said base member.

13. The stabilizing device of claim 7 in which the workpiece includes a base surface portion defining the base of the bore, and in which said means for rotating said member includes
   (A) means for allowing free rotation of said member about its central longitudinal axis, and
   (B) means for pressing said work engaging member against the base of the bore of the workpiece such that the rotation of the workpiece about its central axis produces the rotation of said member about its central axis.

14. An arbor comprising:
   (a) an integral, substantially cylindrical member of compressible, elastic material, said material having a hardness less than Shore D 75, said member having
      (A) a plurality of arcical outside surface portions defining an outside diameter, said arcical outside surface portions extending longitudinally and being laterally spaced apart about the perimeter of said member; and
      (B) a plurality of recessed outside surface portions which extend longitudinally from the first end of said member, each of said recessed outside surface portions being between two of said arcical outside surface portions; and
   (b) means for allowing rotation of said member about its central longitudinal axis.

15. The arbor of claim 14 in which said recessed outside surface portions includes
   (A) a plurality of longitudinal grooves, and (B) a plurality of longitudinal, generally flat surfaces areas.

16. The arbor of claim 14 additionally comprising compression means for compressing said member such that the outside diameter of said member is increased.

17. The arbor of claim 16 additionally including:
(c) a base member; and
(d) a compression screw; and in which said compression means includes said member having a longitudinal bore through its length, said base member having a threaded bore, and said compression screw extending through the length of the longitudinal bore in said member and being threadedly anchored into said base member.

* * * * *